(12) United States Patent
Nishikawa et al.

(10) Patent No.: US 6,923,523 B2
(45) Date of Patent: Aug. 2, 2005

(54) IMAGE PROCESSING METHOD AND IMAGE PROCESSING APPARATUS

(75) Inventors: Hiromitsu Nishikawa, Tokyo (JP); Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/628,406

(22) Filed: Jul. 29, 2003

(65) Prior Publication Data
US 2004/0027406 A1 Feb. 12, 2004

(30) Foreign Application Priority Data

Jul. 31, 2002 (JP) .......................................... 2002-224163
Jul. 31, 2002 (JP) .......................................... 2002-224166

(51) Int. Cl.[7] ................................................. B41J 2/21
(52) U.S. Cl. ...................................................... 347/43
(58) Field of Search ............................. 347/43, 15, 19; 358/1.1, 1.9

(56) References Cited

U.S. PATENT DOCUMENTS

| | | | | |
|---|---|---|---|---|
| 5,121,196 A | * | 6/1992 | Hung | 358/504 |
| 5,508,827 A | * | 4/1996 | Po-Chieh | 358/518 |
| 6,292,195 B1 | * | 9/2001 | Shimizu et al. | 345/604 |
| 6,378,033 B1 | | 4/2002 | Nishikawa | 711/103 |
| 6,575,095 B1 | * | 6/2003 | Mahy et al. | 101/485 |
| 2002/0021458 A1 | | 2/2002 | Saito et al. | 358/515 |
| 2003/0076516 A1 | | 4/2003 | Saito | 358/1.9 |
| 2003/0090713 A1 | | 5/2003 | Saito | 358/1.15 |
| 2003/0202197 A1 | | 10/2003 | Saito et al. | 358/1.9 |
| 2003/0202213 A1 | | 10/2003 | Saito | 358/1.18 |
| 2003/0234946 A1 | | 12/2003 | Saito | 358/1.9 |
| 2004/0070777 A1 | | 4/2004 | Nishikawa et al. | 358/1.9 |

FOREIGN PATENT DOCUMENTS

| | | | |
|---|---|---|---|
| JP | 2136848 A | * | 5/1990 |
| JP | 2-136848 | | 5/1990 |
| JP | 6-242523 | | 9/1994 |
| JP | 6242523 A | * | 9/1994 |

* cited by examiner

Primary Examiner—Thinh Nguyen
(74) Attorney, Agent, or Firm—Fitzpatrick, Cella, Harper & Scinto

(57) ABSTRACT

Patches are accurately printed while avoiding an excessive application of color materials such as ink or toner. On the basis of these patches, a conversion relationship for an accurate color transformation is obtained. Specifically, if any of the patches has a total color material use amount exceeding a maximum total color material use amount determined on the basis of the absorption of ink by printing medium or the like, signal values for this patch are converted so that its total color material use amount does not exceed the maximum total color material use amount. Then, within the range of colorimetric data on patches outputted on the basis of the patch data, a target color having the highest saturation is determined for each hue. Thus, combinations of color materials in a table obtained on the basis of the set target do not exceed the maximum total color material use amount.

42 Claims, 15 Drawing Sheets

IMAGE PROCESSING METHOD AND IMAGE PROCESSING APPARATUS

This application claims priority from Japanese Patent Application Nos. 2002-224163 and 2002-224166 both filed Jul. 31, 2002, which are incorporated hereinto by reference.

BACKGROUND OF THE INVENTION

1. Field of the Invention

The present invention relates to an image processing method and an image processing apparatus, and particularly to a process of using a patch to determine a conversion relationship for a color transformation process relating to data generation for color materials such as ink used in an image output apparatus such as an ink jet printer.

2. Description of the Related Art

In general, when an image output apparatus such as a printer is used to print and output a color image, four color materials for Y (Yellow), M (Magenta), C (Cyan), and K (black) are used. For example, an ink jet printer uses Y, M, C, and K inks. Further, a copy machine or a printer of an electrophotography uses Y, M, C, and K toners.

A color space realized by these color materials, used in the image output apparatus, is normally different from a color space for an original image data. Thus, in the field of image processing in which color material data is generated on based on image data, various image processing methods have been proposed to reproduce faithfully colors or gradations shown by the original image data or to reproduce desired colors and the like.

Among these image processing methods, for example, Japanese Patent Application Laid-Open No. 2-136848 (1990) describes an image processing method that can eliminate the color reproducibility problem associated with a 100% UCR (Under Color Removal) process executed as a part of the color material data generating process. In this method, of various combinations of Y, M, C, and K which can express a color shown by the original image data, those in which K has the highest density are defined to be the combination of Y, M, C, and K. According to this method, in contrast to the 100% UCR, in which one of Y, M, and C which has the lowest density is replaced with K to have a value of 0, combinations of Y, M, C, and K which do not include a value of 0 maybe present. Consequently, an image with no decrease in a saturation or density can be outputted. Furthermore, compared to the image processing described in the above publication, Japanese Patent Application Laid-Open No. 6-242523 (1994) describes an image processing method of setting a value for K taking into account the reproduction ranges of the color materials Y, M, C, and K, a pseudo contour of an output image, interpolation accuracy, and the like to further improve reproducibility.

The above described image processing relating to the color transformation is commonly carried out using a lookup table (LUT) having data used to carry out the color transformation as well as interpolation. The contents of the table are determined by printing patches for a plurality of combinations of the color materials Y, M, C, and K and subjecting the patches to a colorimetric operation. Specifically, if signal values for the respective color materials Y, M, C, and K constituting each patch data are expressed by 8 bits, then for example, patches are printed for 4,096 colors obtained by combining signal values of respective four color materials, each of which is one of 0, 32, 64, . . . , 223, and 255 that are obtained by equally dividing 256 values for the respective colors into eight parts. Then, the patches are subjected to a colorimetric operation, and on the basis of the results of the colorimetric operation, a combination of Y, M, C, and K that reproduces a predetermined target is determined to be table data.

However, even if image processing is executed so as to improve the reproducibility of the image output apparatus such as a printer as described above, actual printing in the printer or the like becomes improper owing to the relationship between the color materials and printing sheets. As a result, images cannot be reproduced as desired.

The processes described in the above two publications simultaneously use the four color materials Y, M, C, and K and thus tend to use a large total amount of color materials. In particular, if a color with a high saturation is expressed at a low lightness, each color material has a high signal value. Consequently, a large amount of color material must be used. In this case, in an ink jet printer, a printing sheet may not sufficiently absorb ink depending on the ink absorption characteristic of the printing sheet. Then, the ink may overflow or bleed, thus hindering density or the like from being accurately realized. Further, with an electrophotographic printer using toner, the toner may not be sufficiently fixed to a printing sheet depending on the toner adhesion characteristic of the printing sheet. Again, the density or the like cannot be accurately realized. As a result, even if image reproducibility is intended to be very high in the image processing for generating color material data, images may not be accurately reproduced in actual printing.

When patch data, described above, is generated and printed on the basis of image processing such as that described above, then similar problems may occur. In particular, in patch printing, patch of data inhibited in normal printing may be printed. Thus, the problem becomes more marked. For example, if the maximum amount of each color material is assumed to be 100% and signal values are such that all the color materials use the maximum amount, then the total amount of color materials applied to the printing sheet is 400%. If the four color materials are used so that their amounts are close to the maximum value, then in the ink jet printer, the printing sheet cannot absorb four types of inks applied so as to be superimposed on one another. Further, the electrophotographic printer using toners cannot appropriately fix the four color toners to the printing sheet. As a result, patches can not be reproduced accurately.

If the patches are thus not accurately printed, colorimetric values, as a matter of course, do not reflect the printing characteristics of a printer that has printed the patches. This makes it impossible to generate the table for accurate color transformation.

Of course, the problem with the amount of color materials used depends on the relative characteristics between printing sheets and the color materials, such as absorption and adhesion characteristics. Accordingly, if the amount of color materials used is, for example, 300%, a similar problem may occur depending on the printing sheets used. Further, even if the total amount of color materials used is based on the above described 100% UCR, a similar problem may occur depending on the relative relationship between the print sheets and the color materials.

SUMMARY OF THE INVENTION

The object of the present invention is to provide an image processing method and an image processing apparatus which allow patches to be accurately printed so as to prevent the excessive application of color materials such as ink and toner, and on the basis of the patches, obtain a conversion relationship for an accurate color transformation.

In the first aspect of the present invention, there is provided an image processing method for determining a conversion relationship by using patches, the conversion relationship relating to a generation of color material data for an image output apparatus that outputs an image by using a plurality kinds of color material, the method comprising the steps of:

providing a maximum total color material use amount which is determined by taking into account an adhesion characteristic of each of the plurality kinds of color material to a printing medium used when the image output apparatus outputs the patches;

determining, for each of patches, a combination of data for the plurality kinds of color material constituting the patch within a range of the maximum total color material use amount;

determining a target color on the basis of colorimetric values of the patches which are outputted based on the determined combinations of data for the plurality kinds of color material for the patches; and determining a combination of data for the plurality kinds of color material corresponding to the color target, and based on the determined combination for the color target, determining the conversion relationship relating to the generation of color material data.

In the second aspect of the present invention, there is provided an image processing method for generating data for outputting a patch from an image output apparatus, the patch being used for correcting an output characteristic of the output apparatus that outputs an image by using a plurality kinds of color material, the method comprising the steps of:

providing a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;

determining a total use amount of the plurality kinds of color material for outputting the patch, based on the combination of data for the plurality kinds of color material for each patch in the first patch data; and generating second patch data by for each patch comparing the total use amount with the maximum total color material use amount and by executing a process on the first patch data based on the comparison result for each patch so that the total use amount is equal to or less than the maximum total color material use amount.

In the third aspect of the present invention, there is provided an image processing apparatus for determining a conversion relationship by using patches, the conversion relationship relating to a generation of color material data for an image output apparatus that outputs an image by using a plurality kinds of color material, the apparatus comprising:

holding means for holding a maximum total color material use amount which is determined by taking into account an adhesion characteristic of each of the plurality kinds of color material to a printing medium used when the image output apparatus outputs the patches;

patch data setting means for setting, for each of patches, a combination of data for the plurality kinds of color material constituting the patch within a range of the maximum total color material use amount;

target color setting means for determining a target color on the basis of calorimetric values of the patches which are outputted based on the determined combinations of data for the plurality kinds of color material for the patches; and color separating means for determining a combination of data for the plurality kinds of color material corresponding to the color target, and based on the determined combination for the color target, determining the conversion relationship relating to the generation of color material data.

In the fourth aspect of the present invention, there is provided an image processing apparatus for generating data for outputting a patch from an image output apparatus, the patch being used for correcting an output characteristic of the output apparatus that outputs an image by using a plurality kinds of color material, the apparatus comprising:

holding means for holding a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;

total use amount calculating means for determining a total use amount of the plurality kinds of color material for outputting the patch, based on the combination of data for the plurality kinds of color material for each patch in the first patch data; and patch data generating means for generating second patch data by for each patch comparing the total use amount with the maximum total color material use amount and by executing a process on the first patch data based on the comparison result for each patch so that the total use amount is equal to or less than the maximum total color material use amount.

With the above arrangement, a combination of color material data for each patch is set under a condition that a total use amount of the color materials for each patch is within the maximum total color material use amount that is determined by taking into account the adhesion characteristics of the color materials such as the absorption characteristic of ink to a printing medium used by the image output apparatus to output the patches, a target color is set on the basis of calorimetric values of the patches that are outputted on the basis of the above set color material data for the patches, and a combination of plural types of color materials corresponding to the set target color is determined to set a conversion relationship for generating color material data. Accordingly, when the target color for a color transformation or the like is set to determine the conversion relationship such as a table for generating color material data, it is possible to output appropriate patches that do not cause ink overflow or toner non-adhesion and to determine the conversion relationship based on the colorimetric values of the appropriate patches.

Further, first patch data is provided which is a combination of respective data for plural types of color material used to output a patch and which is set for each of a plurality of patches, and with the first patch data, if the total amount of color materials used for any of the patches is equal to or larger than the maximum total color material use amount which is set taking into account the adhesion characteristics of the color materials such as the absorption of ink or adhesion of toner to a printing medium used by the image output apparatus to output the patches, a process is executed for the first patch data to reduce the total amount of color materials used below the maximum total color material use amount to generate second patch data. Thus, patches outputted on the basis of the second patch data serve to prevent inappropriate patch outputs such as ink overflow and inappropriate toner adhesion.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
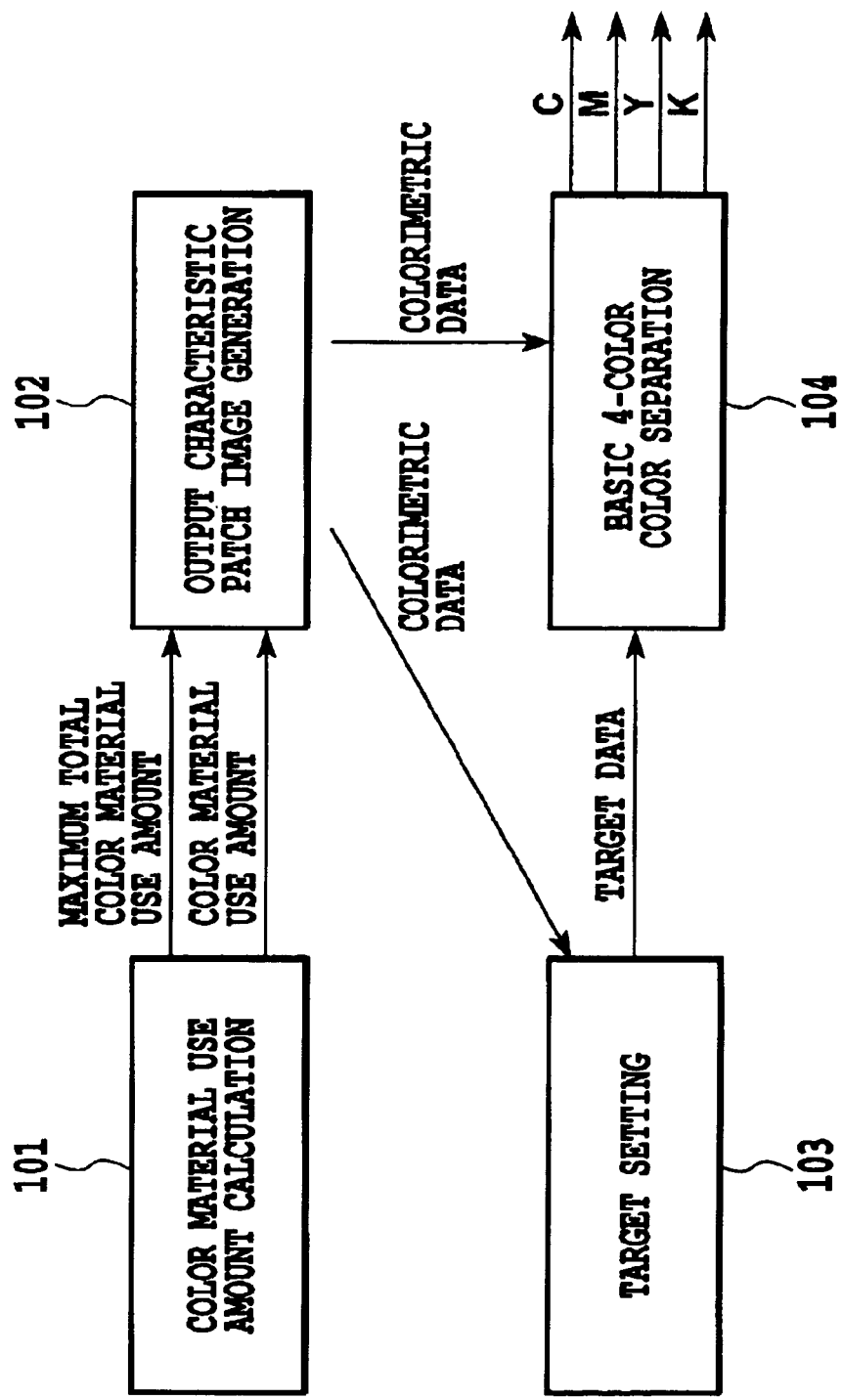
FIG. 1 is a block diagram showing a configuration of image processing executed by a color printer according to a first embodiment of the present invention.

Embodiments of the present invention will be described below in detail with reference to the drawings.
(First Embodiment)
FIG. 1 is a block diagram showing a configuration of image processing for a color printer according to an embodiment of the present invention. This figure shows a process (herein after also called "color separation process") of forming patches and generating table data based on the results of a colorimetric step executed on the patches. This configuration specifically shows a process executed by, for example, a printer driver in a host computer as described below. However, this process may be executed by an image output apparatus such as a printer or shared by a host apparatus and the image output apparatus. It is apparent from the description below that the present invention is applicable to both of these forms.

As shown in FIG. 1, in the color separation process, a color material use amount calculation 101 is executed to calculate an amount (a color material use amount) of color material that is used, for each of the four inks Y, M, C, and K, which are used in the printer of the present embodiment, as well as a maximum total color material use amount.

The color material use amount is determined for each of the inks Y, M, C, and K. In the present embodiment, the color material use amount is calculated in terms of 0% to 100% for signal values 0 to 255 each expressed by 8 bits, on the basis of a proportional relationship. Here, the use amount "A"% basically means that when a printing sheet is printed using ink ejection data for the printer which is obtained by subjecting an 8-bit signal to quantization such as binarization, an ink dot is formed on a corresponding pixel at the average probability of "A"%. However, taking a permeability of the inks Y, M, C, and K into consideration, for some inks, this amount may be calculated in terms of 0% to 80% for the signal values 0 to 255, on the basis of a proportional relationship.

Then, when the color material use amount of e.g. ink C calculated, as described above, is assumed to be 100% (i.e. the use amount is 100% at the maximum signal value of 255), the maximum total color material use amount is determined as follows. Information on the type of a printing medium used in the printer, i.e. information on whether the printing medium used are ordinary paper, coated paper, or OHP paper, is obtained, and then on the basis of this information, the maximum percentage at which the ink C can be absorbed by the printing medium is calculated as the maximum total color material use amount.

An output characteristic patch image generation process 102 uses the maximum total color material use amount and the color material use amount for the four inks Y, M, C, and K, calculated by color material use amount calculation 101 so as to generate data for patches that can be printed while avoiding ink overflow (a condition that the ink can be absorbed by the printing medium). The patches printed based on this data are subjected to a colorimetric operation to obtain data on a color space expressed by L*a*b*, which can be reproduced by the printer. Of course, this colorimetric system is not limited to this aspect. It may be another colorimetric system for RGB, L*C*H*, or the like.

A target setting process 103, on the basis of the colorimetric data on the patches, generates a target having the highest saturation for each of the six hues Y (Yellow), M (Magenta), C (Cyan), R (Red), G (Green), and B (Blue) as described later in detail in FIG. 9. Then, a basic-4-color separation process 104, under the condition that the saturation is highest for each hue (the above targets), determines combinations of Y, M, C, and K and makes the combinations contents of a color separation table for a color transformation.

Figure 2:
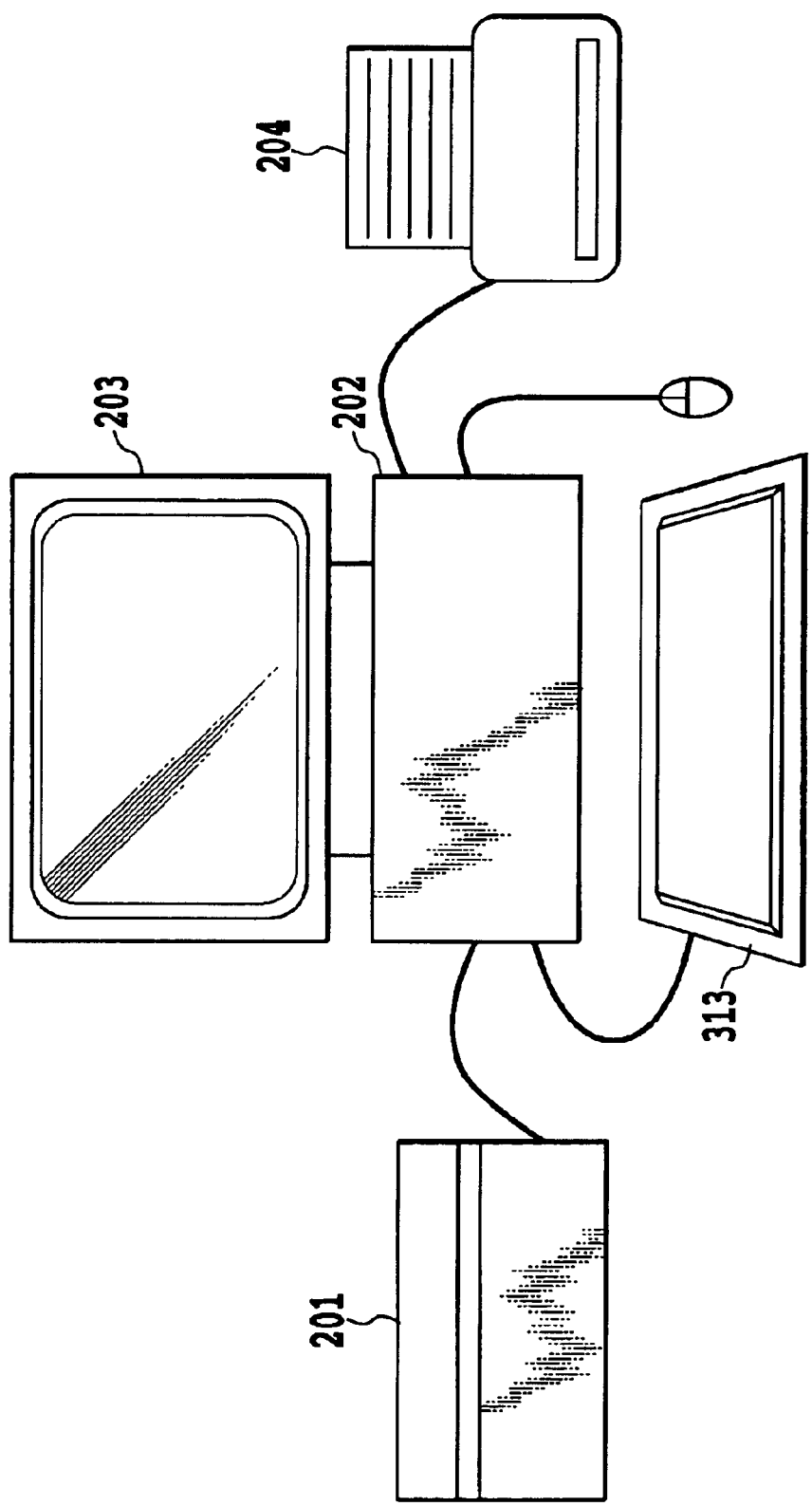
FIG. 2 is a diagram showing a specific image processing system that executes the image processing shown in FIG. 1.

FIG. 2 is a diagram showing a specific image processing system that executes the above image processing.

In this figure, reference numeral 201 denotes a spectrophotometer as an image signal input apparatus. Reference numeral 202 denotes a personal computer as a computer system. An image signal read by the spectrophotometer 201 is inputted to the personal computer 202. The personal computer 202 can then edit and store the image signal. It can also use a display 203 to display image signal information obtained by the edition or the like or can use a printer 204 as an image output apparatus to print the information. Further, reference numeral 313 denotes a keyboard and a mouse used by a user to input instructions on processing and control executed by the personal computer 202.

Figure 3:
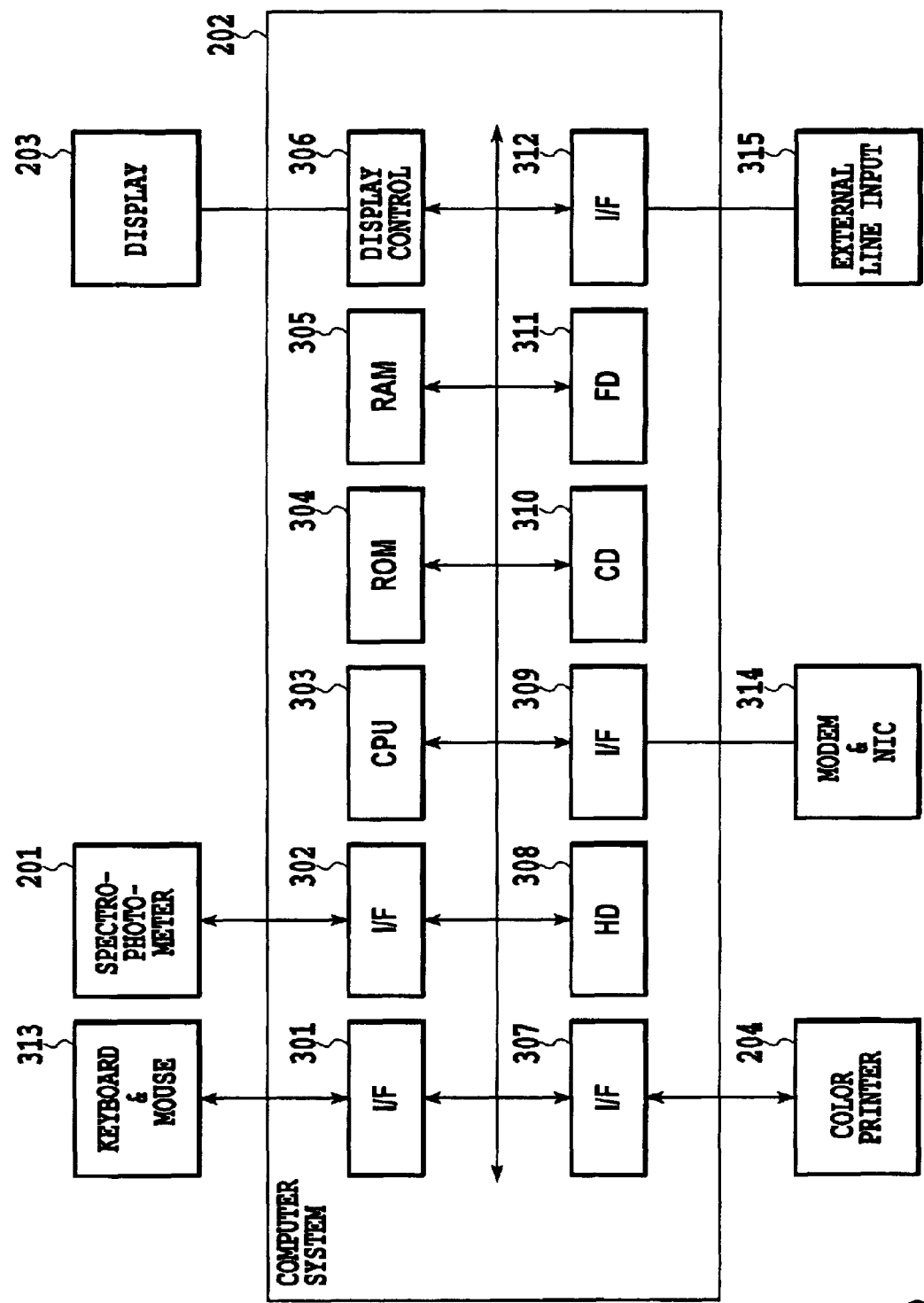
FIG. 3 is a block diagram especially showing main elements of a personal computer in the system shown in FIG. 2.

FIG. 3 is a block diagram showing main components of the system shown in FIG. 2, especially of the personal computer 202.

In this figure, reference 301 denotes an interface (I/F) used to transmit and receive signals to and from the mouse and keyboard 313. Reference numeral 302 denotes also an interface (I/F) used to transmit and receive signals to and from the image input apparatus such as the spectrophotometer 201.

Reference numeral 303 denotes a CPU which controls, in accordance with programs, processing and operations performed by each element of the personal computer 202 and which execute predetermined processing. Reference numeral 304 denotes a ROM that stores the image processing shown in FIG. 1 and described later in FIG. 4, and the like. Reference numeral 305 denotes a RAM that temporarily stores programs and image data when the CPU executes the above processing or the like.

Reference numeral 306 denotes a display control device that controls the display device 203 displaying messages to an operator. Reference numeral 307 denotes an interface (I/F) used to connect the computer system 202 and the color printer 204 through signals. Reference numeral 308 denotes a hard disk (HD) which stores programs and image data to be transferred to the RAM 305 or the like for use and which saves processed image data. Reference numeral 309 denotes an interface (I/F) which connects, through signals, the computer system and transmission equipment 314 such as a modem or a network card which can transmit to external equipment various data to be retained in the respective areas in the computer system and receive various data from the external equipment. Reference numeral 310 denotes a CD drive that can read stored data from or write data in a CD (CD-R/CD-RW/DVD), an external storage medium. Reference numeral 311 denotes an FD drive that can similarly read data from and write data in an FD. If image editing programs or printer information or the like is stored in a CD, FD, DVD, or the like, these programs are installed in the HD 309 and transferred to the TAM 305 as required. Reference numeral 312 denotes a sound interface (I/F) to which an external line input 315 or a microphone is connected to receive external sound data.

Figure 4:
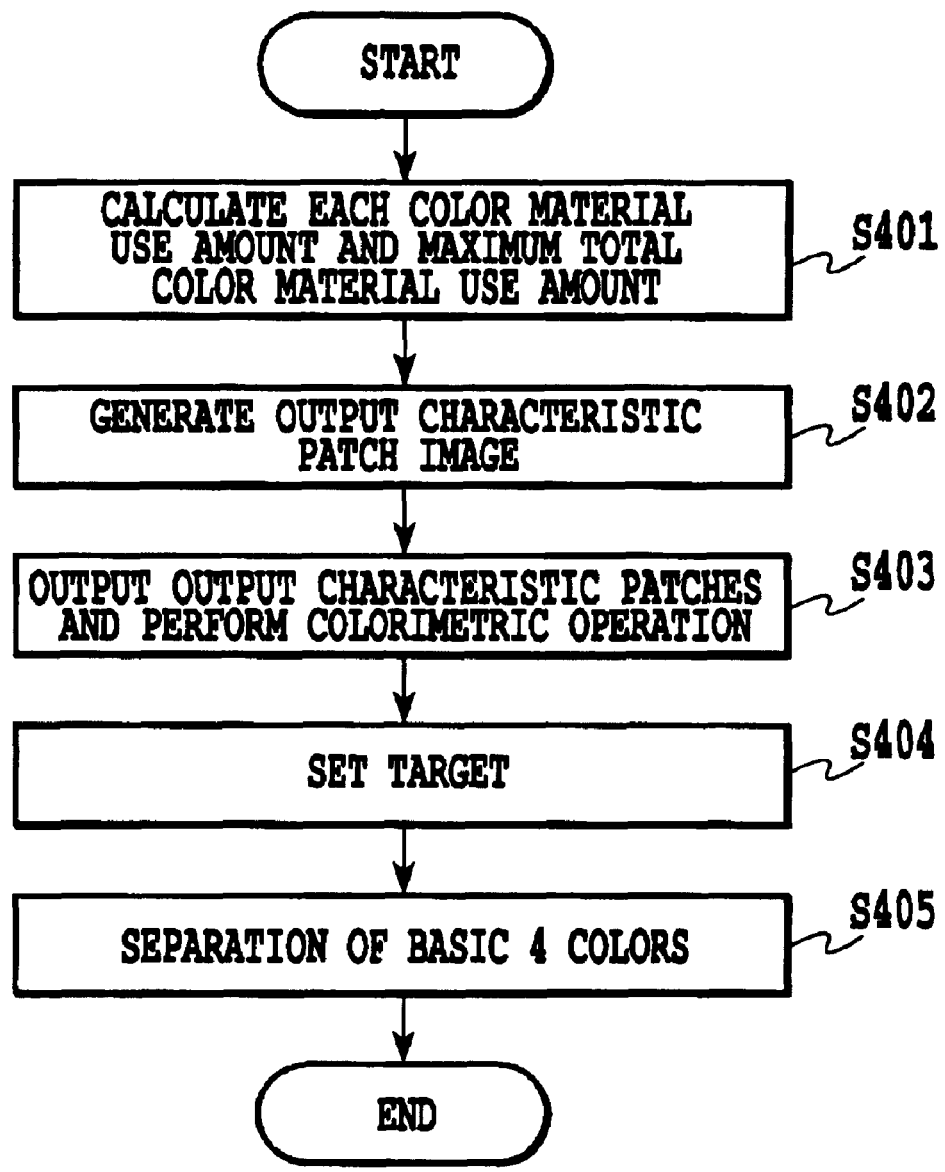
FIG. 4 is a flow chart showing a procedure of the image processing shown in FIG. 1, more specifically of a color separation table creating process executed by the configuration shown in FIGS. 2 and 3.

FIG. 4 is a flow chart showing a procedure of the image processing shown in FIG. 1, especially of a color separation table generating process executed by the configuration shown in FIGS. 2 and 3. A computer executable program in which the procedure shown in the flow chart in FIG. 4 is described is previously stored in the ROM 304. Alternatively, a program stored in the external storage device 308 may be loaded onto the RAM 305 so that the CPU 303 can execute the program.

First, at step S401, the maximum total color material use amount is calculated in accordance with the type of printing medium which is used in the printer, and the color material use amount is calculated for each of the signals for Y, M, C, and K. As described in detail in FIG. 1, the color material use amount (%) is calculated for each of the 256 signal values of 0 to 255 for each of the inks Y, M, C, and K. Further, the maximum total color material use amount is determined by obtaining information on the type of printing medium to be used in the printer of the present embodiment and calculating the maximum amount of ink (%) that can be absorbed by the printing medium. Specifically, the maximum total color material use amount can be determined by making reference to a previously determined relation between the type of printing medium and the maximum amount of ink that can be absorbed by that type of printing medium. The color material use amount for each ink calculated as described above and the maximum total color material use amount calculated in accordance with the type of printing medium are temporarily stored in RAM 305. It should be noted that the information on the type of printing medium may be set by an operator through a user interface when the operator instructs an execution of a program of this process, or may be detected by a media sensor (not shown) that reads the information on the type of printing medium. In order to deal with new type of printing medium, a value of the information read by the media sensor maybe transmitted to a server thorough a network (not shown), and then the server recognizes what type the printing medium to be used is and gives back the value to the system shown in FIG. 2. Further, information on a correspondence between the type of printing medium and the maximum total color material use amount, which is held and used in the system shown in FIG. 2, may provided to a user, as information of version upgraded for the above application program dealing with the new type of printing medium, when the new type of printing medium is marketed. Then the user may rewrite a database of the application by using the information provided. If the above-described configuration for dealing with the new type of printing medium is employed, the user can input the information on the type of printing medium through the user interface to obtain the information on the maximum total color material use amount for the new type of printing medium.

Then, in step S402, the output characteristic patch image generation process 102 (FIG. 1) is executed to generate patches while avoiding ink overflow.

Figure 5:
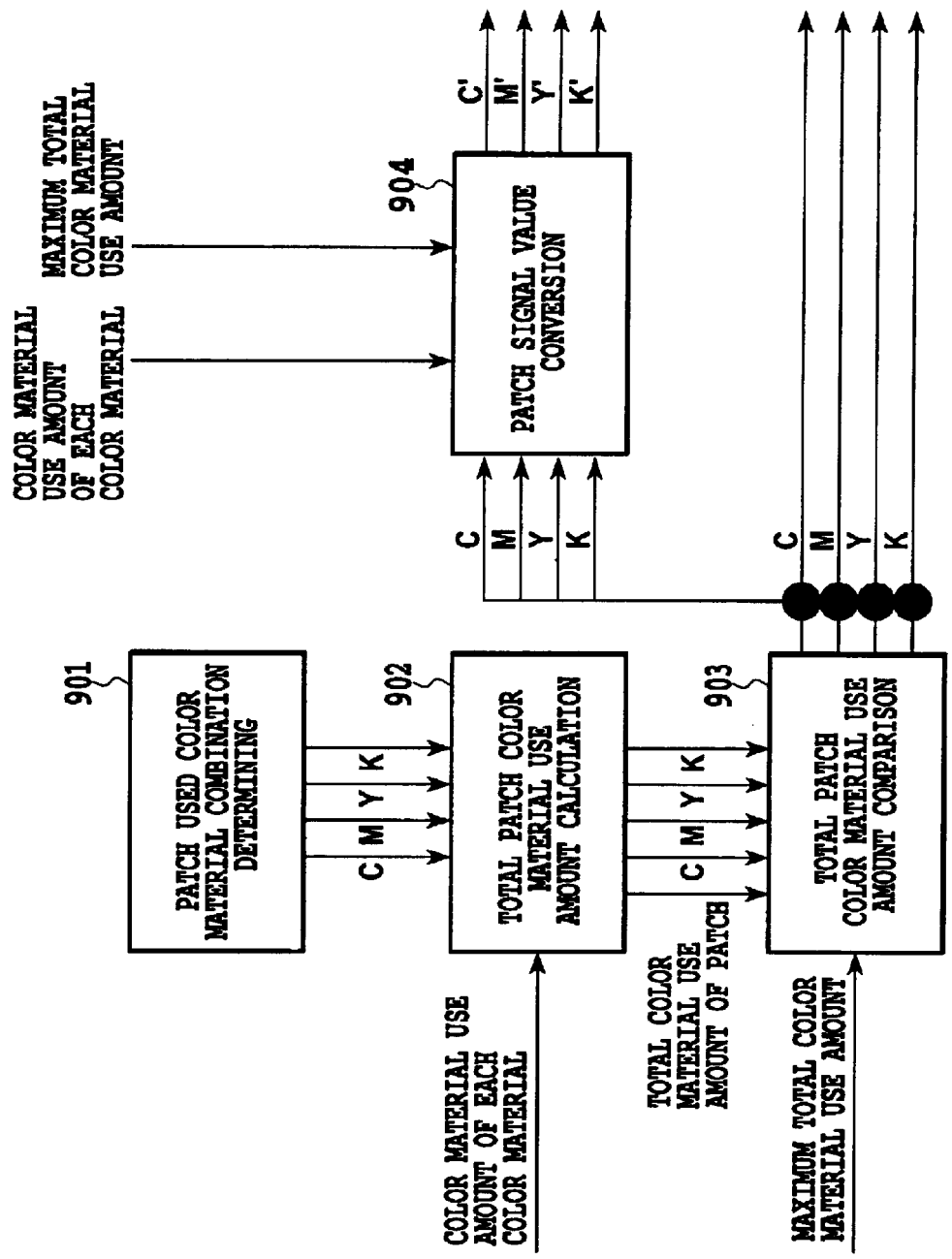
FIG. 5 is a block diagram showing the details of an output characteristic patch image generating process shown in FIG. 1.
Figure 6:
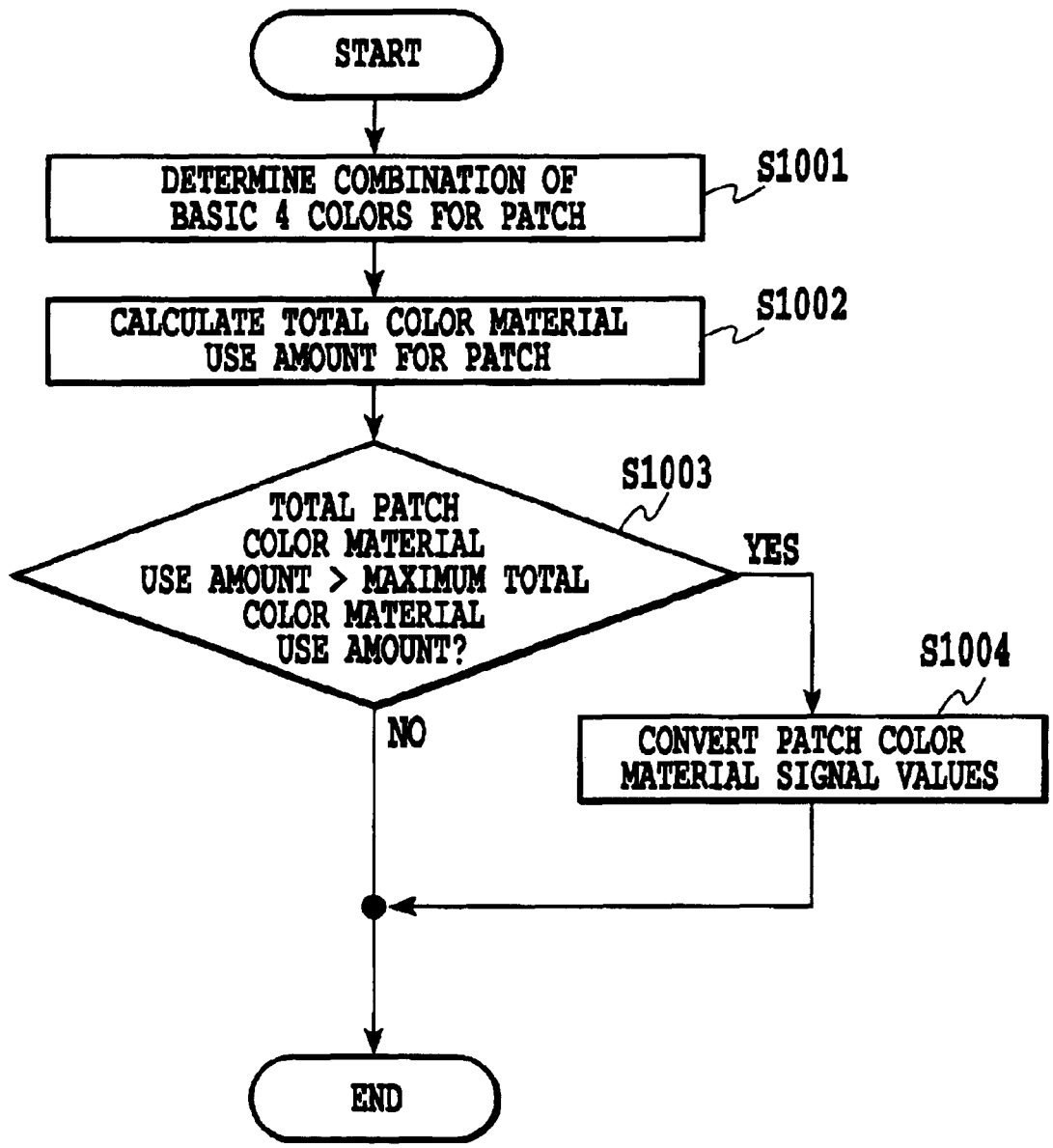
FIG. 6 is a flow chart showing the details of the output characteristic patch image generating process.

FIG. 5 is a block diagram showing the details of processing executed in the output characteristic patch image generation 102. FIG. 6 is a flow chart showing the details of the procedure, i.e. the processing executed in step S402. A patch generation process will be described with reference to these drawings.

First, in step S1001, a patch used color material combination determining process 901 is executed to determine a combination of the basic 4 colors Y, M, C, and K, constituting the patches. The present embodiment determines combinations of eight levels into which the signal values 0 to 255 for the inks Y, M, C, and K are equally divided, i.e. $8^4=4,096$ combinations. The calculated combinations for the basic 4 colors are temporarily stored in the RAM 305. In this regard, the setting for patch data is not limited to this aspect but any setting may be used. For example, the color materials for which the signal values are randomly set may be arbitrarily combined together.

Next, in step S1002, a total patch color material use amount calculating process 902 is executed to calculate the total color material use amount of each combination of the basic 4 colors determined in step S1001, on the basis of the color material use amount for each signal value for each ink calculated in step S401. The total color material use amounts calculated are also stored in the RAM 305.

Furthermore, in step 1003, a total patch color material use amount comparing process 903 is executed to compare the total color material use amount of each combination calculated in step S1002 with the maximum total color material use amount calculated in step S401 to determine whether or not the total color material use amount of that combination exceeds the maximum total color material use amount. If the result of this comparison and determination indicates that the total color material use amount is, for all the patches, equal to or less than the maximum total color material use amount, the patches set in step S1001 are printed (step S403).

On the other hand, if any of the patches has a total color material use amount larger than the maximum total color material use amount, then in step S1004, a patch signal value converting process 904 is executed to convert the signal values for all the patches set in step S1001 so that the total color material use amount for each patch is equal to or smaller than the maximum total color material use amount.

Specifically, the signal values for the patch exceeding the maximum total color material use amount are compressed by setting a compression ratio so that these signal values are equal to or smaller than the maximum total color material use amount (in the present embodiment, equal to the maximum total color material use amount). In addition to this compressing, as described later for FIG. 7, the signal values for a patch having a predetermined positional relationship with the exceeding patch are compressed using the same compression ratio. Thus, the signal values are converted for all the patches set in step S1001 so that the total color material use amount for each patch does not exceed the maximum total color material use amount.

Figure 7:
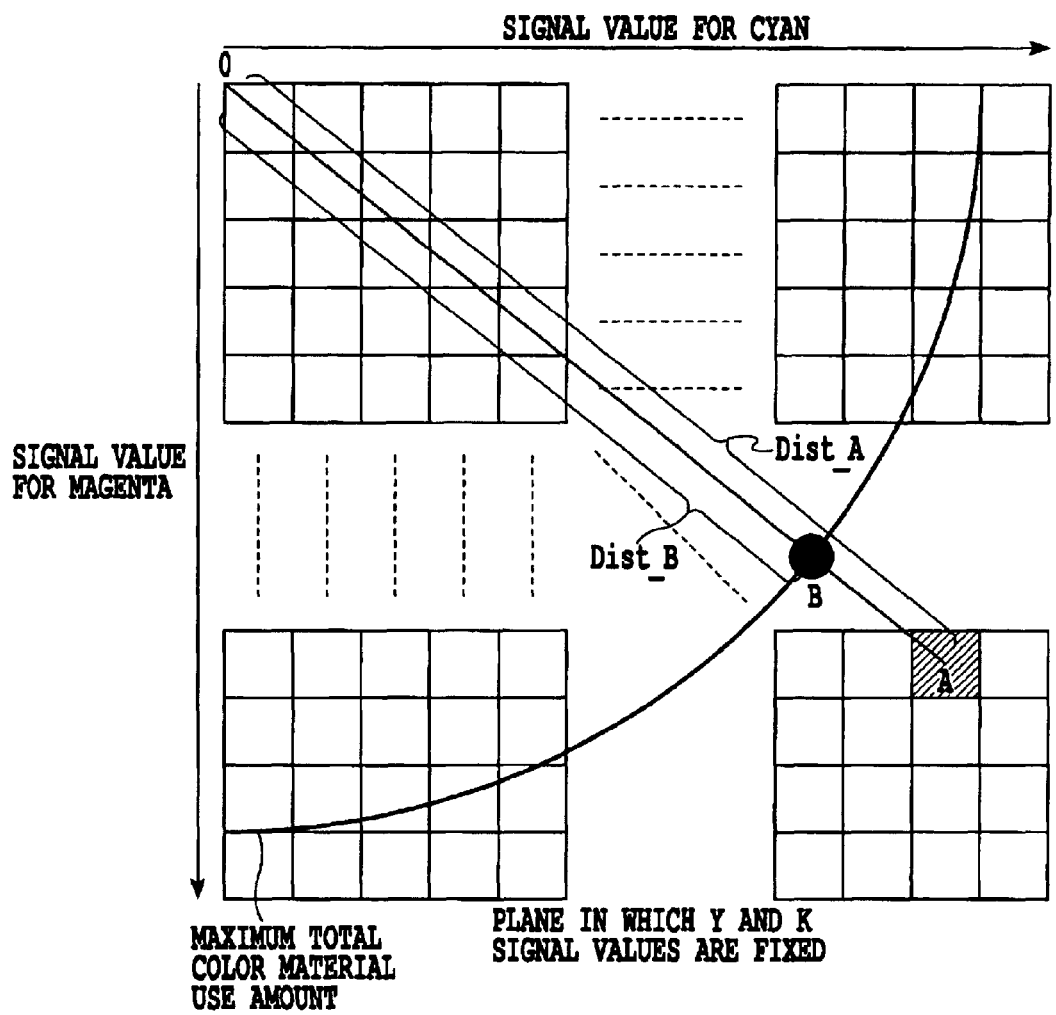
FIG. 7 is a diagram showing a boundary of a maximum total color material use amount in the patches which is determined in the patch image generating process.

FIG. 7 is a diagram of patches showing a boundary for the maximum total color material use amount determined as described above as well as a manner of compression. This figure shows the patches generated by combining the basic 4 colors together and changing the signal values for the inks C and M while fixing the signal values for the inks Y and K. Further, in this figure, the smallest squares each represents one patch, with the illustration of patches in an intermediate portion omitted.

The boundary between an area in which the total color material use amount exceeds the calculated maximum total color material use amount and an area in which the total color material use amount does not exceed the maximum total color material use amount is represented as a line for the maximum total color material use amount drawn as a quarter circumference in the figure. This line is represented as a circumference for the convenience of description and illustration. However, actually, the boundary line corresponds to the case in which a value for the ink (color material) use amount into which the sum of the signal values for the inks(Y, K) C and M has been converted equals the given maximum total color material use amount. For example, if the signal values for the inks C and M are converted into ink use amounts at the same rate, then this line is straight.

When the inks Y and K have relatively large signal values, then the total color material use amount is large as a whole. Accordingly, the line of the maximum total color material use amount appears on patch data as shown in the figure. Specifically, when the C and/or M, constituting the patches, has a larger signal value than the line of the maximum total color material use amount for C and/or M, the patch printed based on the combination of these signals is not accurately printed because of possible ink overflow. Thus, in the present embodiment, when the C and/or M, constituting the patches, has a larger signal value than the line of the maximum total color material use amount, and one of these patches exceeding the line is shown at A in the figure, then a conversion is executed, as shown below, so that the signal values for the patch A and the signal values for patches having the same ratio of the signal values C, M as the ratio of C to M for the patch A are compressed by using the distance Dist_A from an origin 0 to the patch shown by A and the distance Dist_B from the origin 0 to a point B where a straight line joining the origin 0 with the patch A crosses the line for the maximum total color material use amount. Specifically, the signal values for the patches located on the line joining the origin 0 with the patch A, which include the one within the maximum total color material use amount line, are compressed at the same compression rate.

$C'=C\times(\mathrm{Dist\_B/Dis\_A})$ $M'=M\times(\mathrm{Dist\_B/Dist\_A})$

As described above, not only the patch exceeding the maximum total color material use amount line but also the patches within the maximum total color material use amount line are subjected to the compression process at the respective compression rates corresponding to the patch exceeding the maximum total color material use amount line. Thus, the total color material use amount is located inside the maximum total color material use amount for all the patches.

In the above description, the values for the color materials Y and K are fixed, and the patches with these values have been described. However, of course, patches in which the color materials Y and K have other values are similarly processed and all the patches exceeding the maximum total color material use amount are compressed for all the combinations of the color materials Y, M, C, and K calculated in step S401. Further, in the above example, the signal values for the color materials M and C are compressed. However, the signal values for other color materials may be compressed. Alternatively, the maximum total color material use amount may be calculated one-, three-, or four-dimensionally so that the signal values for one, three, or four color materials can be compressed. Furthermore, the conversion of the signal values is not limited to the use of the ratio of the distances from the origin 0 and the respective points. It is possible to use, for example, the ratio of the volume of a cubic with the Dist_A as one side to the volume of a cubic with the Dist_B as one side or the ratio of the volume of a sphere with a radius of the Dist_A to the volume of a sphere with a radius of the Dist_B.

In the above compression process, the combinations of the basic 4 colors are redetermined to finish step S402. As a result of this step, none of the printed patches exceed the maximum total color material use amount, and therefore proper patches can be printed without causing ink overflow or the like.

Referring back to FIG. 4, in the next step S403, the printer 204 of the present embodiment prints the patches on the basis of the patch data generated in step S402. Then, the printed patches are subjected to a calorimetric operation. The colorimetric operation for the patches can be performed using the spectrophotometer 201 or the like. The results of the colorimetric operation on the patches in terms of L*a*b* values are temporarily stored in the RAM 305. Further, if the results of the colorimetric operation require a large capacity, the external storage device 308 or the like is also utilized.

In step S404, within the range of the calorimetric operation, a target as a target color having the highest saturation is set for each of the six hues Y (Yellow), M (Magenta), C (Cyan), R (Red), G (Green), and B (Blue). In this regard, a color system for the target colors is not limited to L*a*b* but may be another colorimetric system such as L*C*H*.

The target for each hue is, for example in the case of the hue of cyan, what specifies the movement of colors white→cyan→black in a L*C* plane. This serves to set the characteristics of color transformation relating to a color reproduction. In the present embodiment, this target is represented as a color in an L*a*b* space, with its value represented as the distance from an L* axis (lightness axis) in an L*C* plane. Specific target data is represented as the above distance data for a predetermined number of points along the L* axis.

Figure 8:
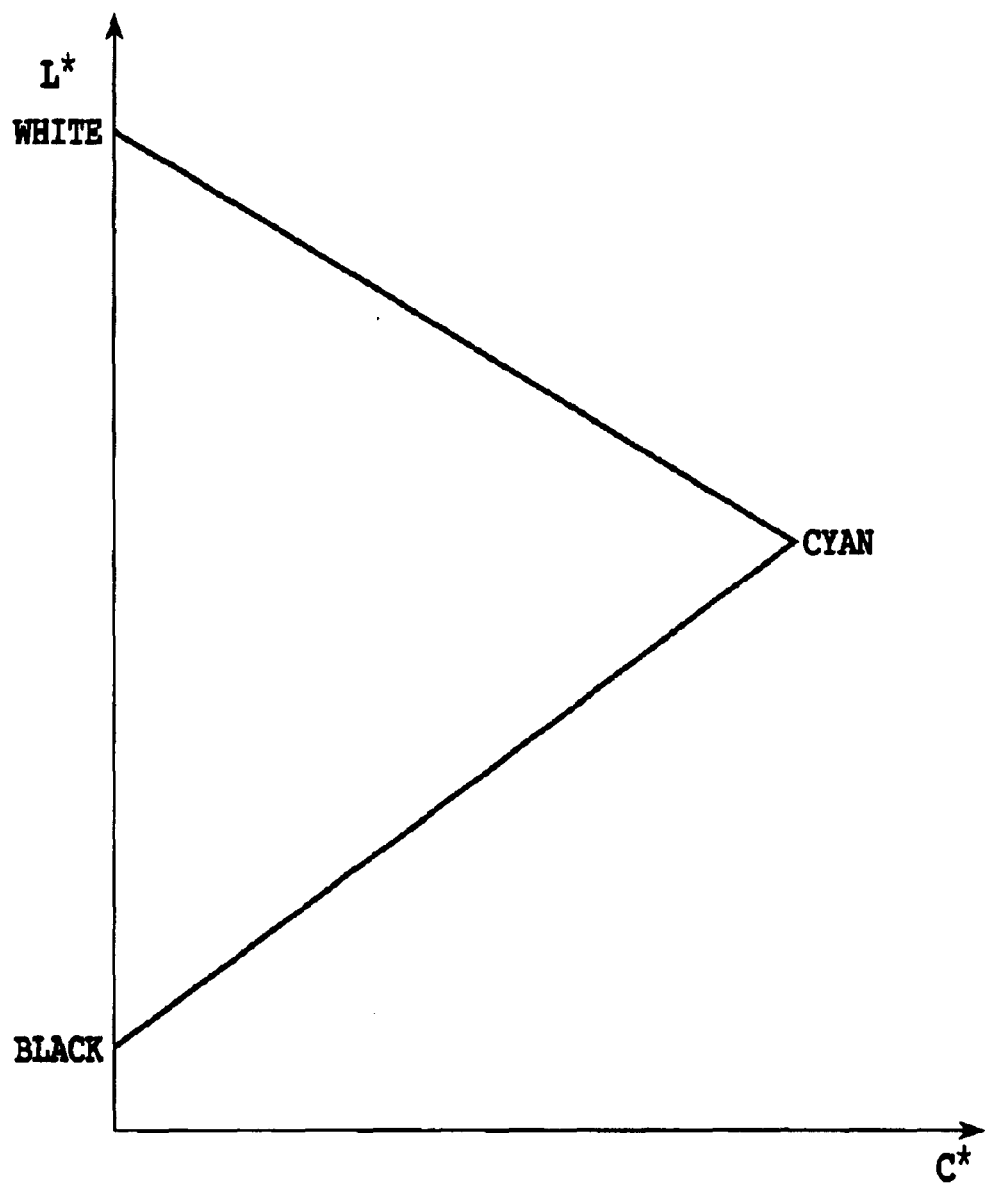
FIG. 8 is a graph illustrating the general characteristics of a target on a L*C* plane for white→cyan→black used for the color separation table generating process.

In general, as shown in FIG. 8, the saturation (C*) of the target white→cyan→black in the L*C* plane increases until the target reaches cyan of a primary color while and decreases from the primary color of this target, having the highest saturation, to black, as the lightness (L*) decreases from white to black. For the setting for the target, it is known that a higher saturation is generally obtained by providing more of the color material K particularly while the saturation of the target is decreasing from its primary color to black, e.g. in an area from cyan to black, and then adding the color materials Y, M, and C.

Figure 9:
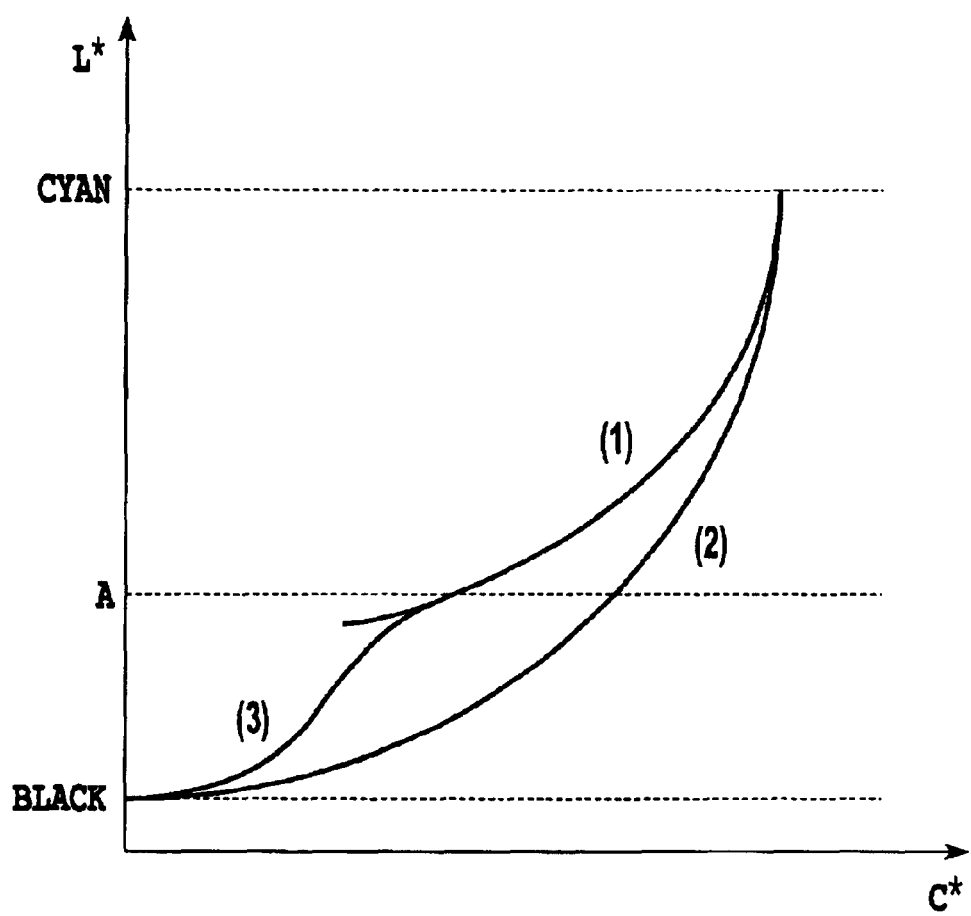
FIG. 9 is a graph illustrating a target of the embodiment used for the color separation generating process.

In the present embodiment, first, for the area from cyan to black, in the L*C* plane shown in FIG. 9, a target with no amount of K which target is represented by a curve (1) and a target with a maximum amount of K which target is represented by a curve (2) are determined for a predetermined range of L*.

That is, in the present embodiment, the curve (1) and the curve (2) are determined within the range of the data obtained in step S403 through the colorimetric operation. Specifically, with reference to the colorimetric values (in the present embodiment, L*a*b* values) for the patches on the boundary as the maximum total color material use amount which values have been determined in step S402, the curve (1) and the curve (2) are determined so that the saturation C* is highest within this range. Thus, table data on the combinations of Y, M, C, and K determined in the next step S405 on the basis of the set target does not exceed the maximum total color material use amount.

Then, taking into account the trade-off that for the two curves, adding the color material K earlier at a point with a higher L*, i.e. at a lighter point, increases the saturation but makes the color material K more granularity, as well as other tradeoffs, a point A in the area from cyan to black is set where the color material K starts to be added. In an area from L* value represented by this set point A to black of the darkest point, a predetermined continuous functional expression such as a spline function as represented by a curve (3) is used to join the two curves smoothly. Then, this joined curve is set as the target of white→cyan→black. The targets for the respective hues thus calculated are stored in the RAM 305. If they require a larger capacity, the external storage device 308 is also utilized.

Then, in step S405, combinations of the color materials C, Y, and K are determined which realizes the targets for the respective hues, set in step S404 and saved to the RAM 305 or the external storage device 308. These combinations constitute a color separation table.

Specifically, the combinations of the color materials C, M, Y, and K are determined by selecting, for example, eight or four points that are represented by the colorimetric values of the patches close to the L*a*b* value representing each target, and interpolating the Y, M, C, and K values for these patches on the basis of a cubic interpolation or a tetrahedral interpolation. Of course, the interpolation method is not limited to the above example.

Figure 10:
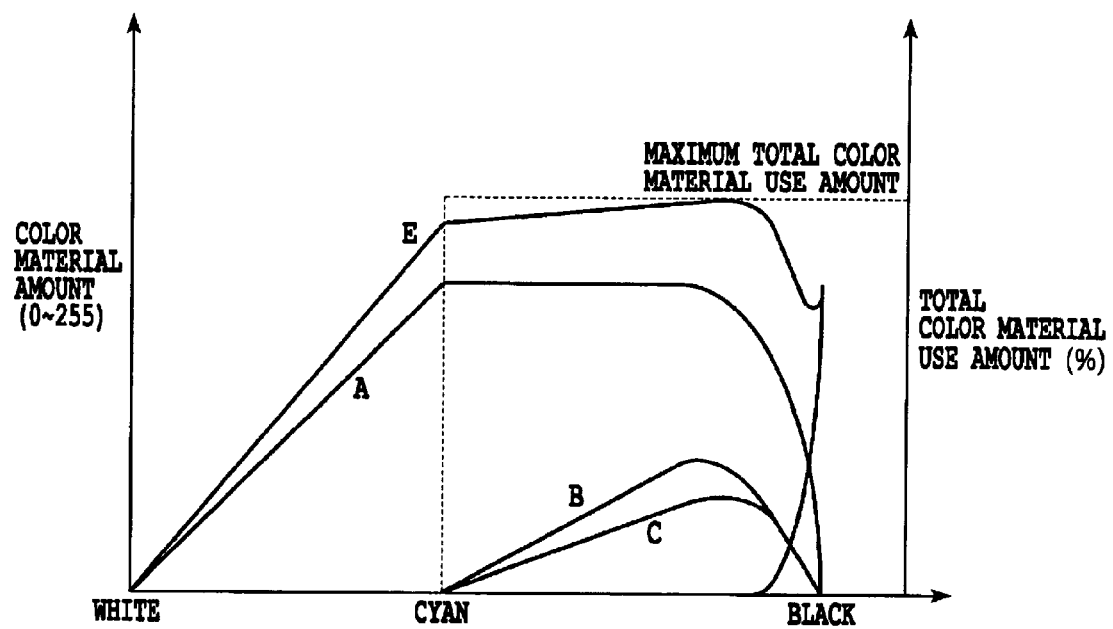
FIG. 10 is a graph showing the amounts of color materials C, M, Y, and K and the total material use amount, for the target determined in the embodiment.

FIG. 10 is a graph showing the amounts of color materials C, M, Y, and K and the total color material use amount for the target of the hue white→cyan→black, which is one of the targets determined as described above. The axis of abscissa indicates a color changing from white through cyan to black. The axis of ordinate indicates the amounts of color materials (the amount of ink) in signal values and the total color material use amount in percentage. In this figure, A denotes the amount of C (Cyan) ink, B denotes the amount of M (Magenta) ink, C denotes the amount of Y (Yellow) ink, and D denotes the amount of K (black). These amounts of inks are in terms of signal values. E denotes the total color material use amount.

As apparent from this figure, the calculated combinations of the color materials C, M, Y, and K do not exceed the maximum color material use amount (a dashed line). Once step S405 is ended, the present process is completed.

(Second Embodiment)

A second embodiment of the present invention is differ from the above described first embodiment in the manner in which patch data is compressed in the case that the total color material use amount determined from patch data exceeds the maximum total color material use amount. In the first embodiment, the compression rate is calculated in accordance with the position of a patch (signal values) which exceeds the maximum total color material use amount. Then, the signals values for this patch and a patch having a predetermined positional relationship with this patch are compressed. On the other hand, in the present embodiment, the compression is carried out more simply. Specifically, all the patches are uniformly compressed using a compression rate corresponding to one of the patches exceeding the maximum total color material use amount which has the largest total color material use amount. Description will be given below of the differences from the first embodiment.

Figure 11:
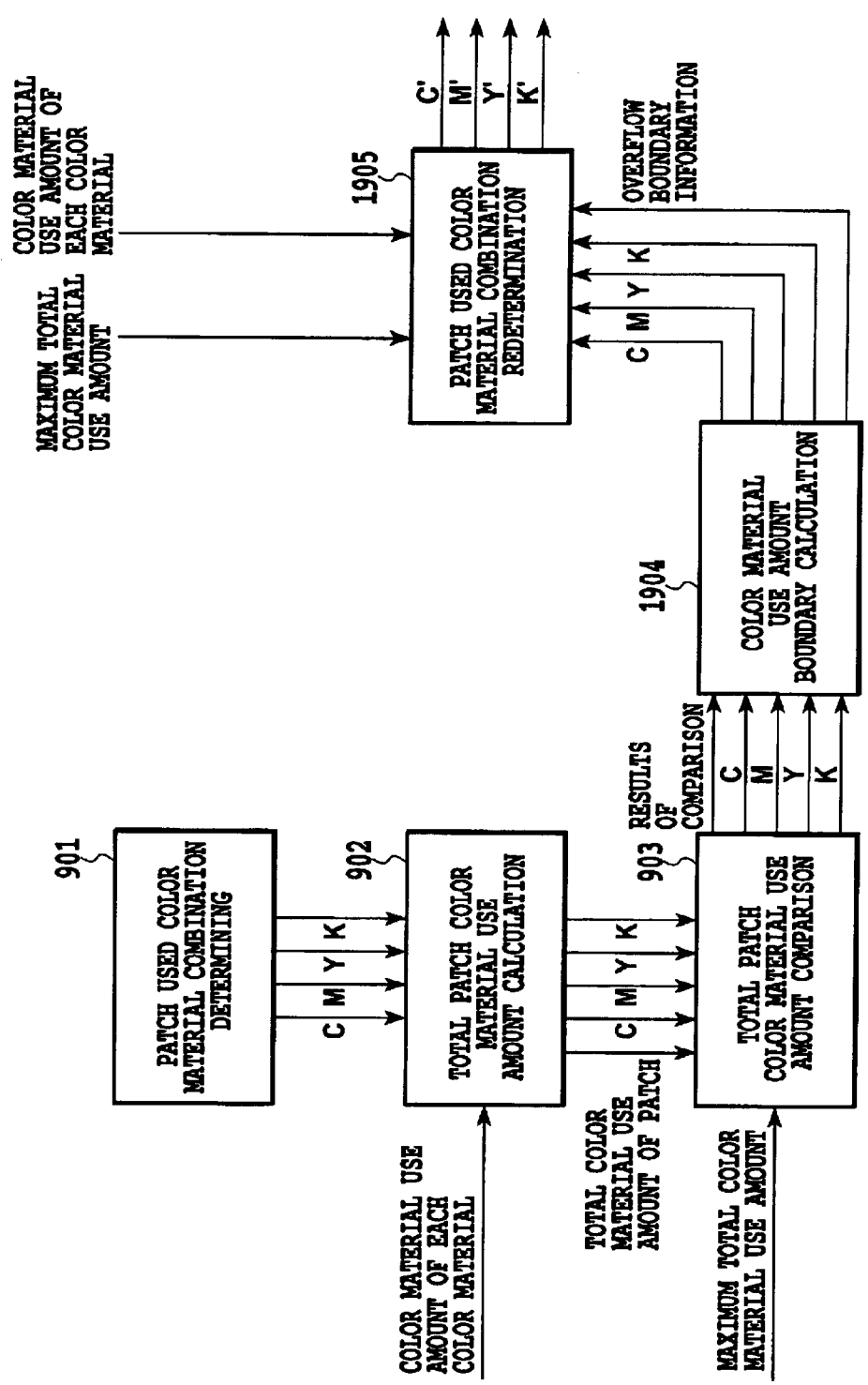
FIG. 11 is a block diagram showing the details of the output characteristic patch image generating process shown in FIG. 1, according to a second embodiment of the present invention.
Figure 12:
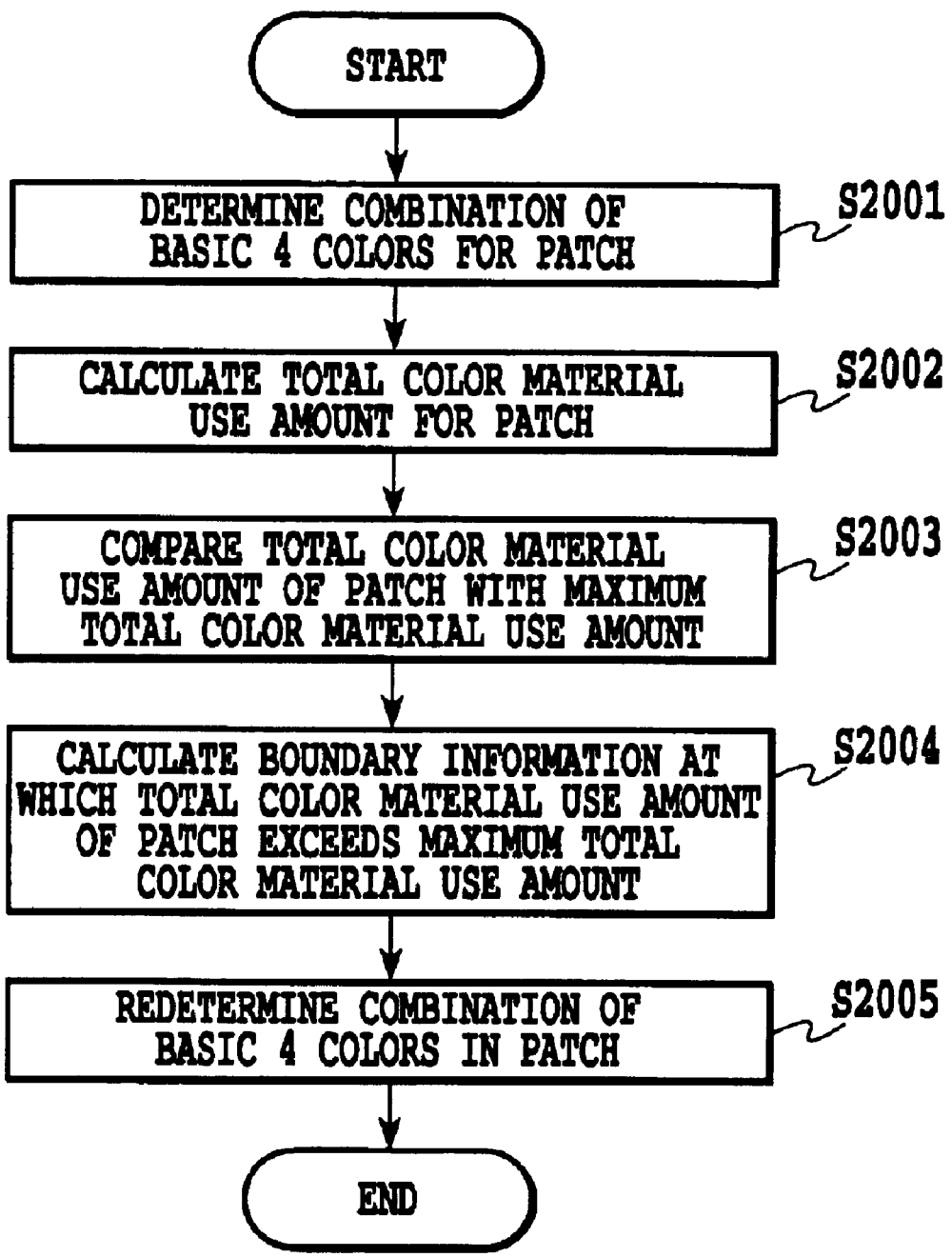
FIG. 12 is a flow chart showing the details of a procedure of the output characteristic patch image generating process.

FIG. 11 is a block diagram showing the details of the output characteristic patch image generating process 102 shown in FIG. 1, according to the present embodiment. FIG. 12 is a flow chart showing a procedure of this process, i.e. the details of the processing executed in step S402. With reference to these figures, description will be given of a patch generating process according to the present embodiment. Elements similar to those described in the first embodiment are denoted by the same reference numerals. Their description is omitted.

The processing in steps S2001 and S2002 is the same as the processing in steps S1001 and S1002, shown in FIG. 6 for the first embodiment. Thus, its description is omitted.

In step S2003, a total patch color material use amount comparing process 903 is executed to compare the total color material use amount of each of the combinations calculated in step S2002 with the maximum total color material use amount calculated in step S401 as shown in FIG. 4. It is thus determined whether or not the total color material use amount of this combination exceeds the maximum total color material use amount. The information on whether or not the total color material use amount of this combination exceeds the maximum total color material use amount is stored in the RAM 305 in association with this combination.

Then, in step S2004, a total color material use amount boundary calculating process 1904 is executed to collect combinations determined to exceed the maximum total color material use amount and calculate, for each combination, the difference amount between the amount for each color varying according to C, M and the maximum total color material use amount. Furthermore, a compression rate for patch data used in the next step S2005 is calculated as boundary information and stored in the RAM 305. That is, the compression rate is set so that the signal value for the patch (point B in FIG. 13, described later) having the largest amount among the patches that exceed the maximum total color material use amount is equal to or less than the maximum total color material use amount (in the present embodiment, the former is equal to the latter). The compression rate corresponds to the ratio of a distance OB' to a distance OB. Then, in step S2005, this compression rate is used to compress uniformly data on all the patches including those which do not exceed the maximum total color material use amount.

Figure 13:
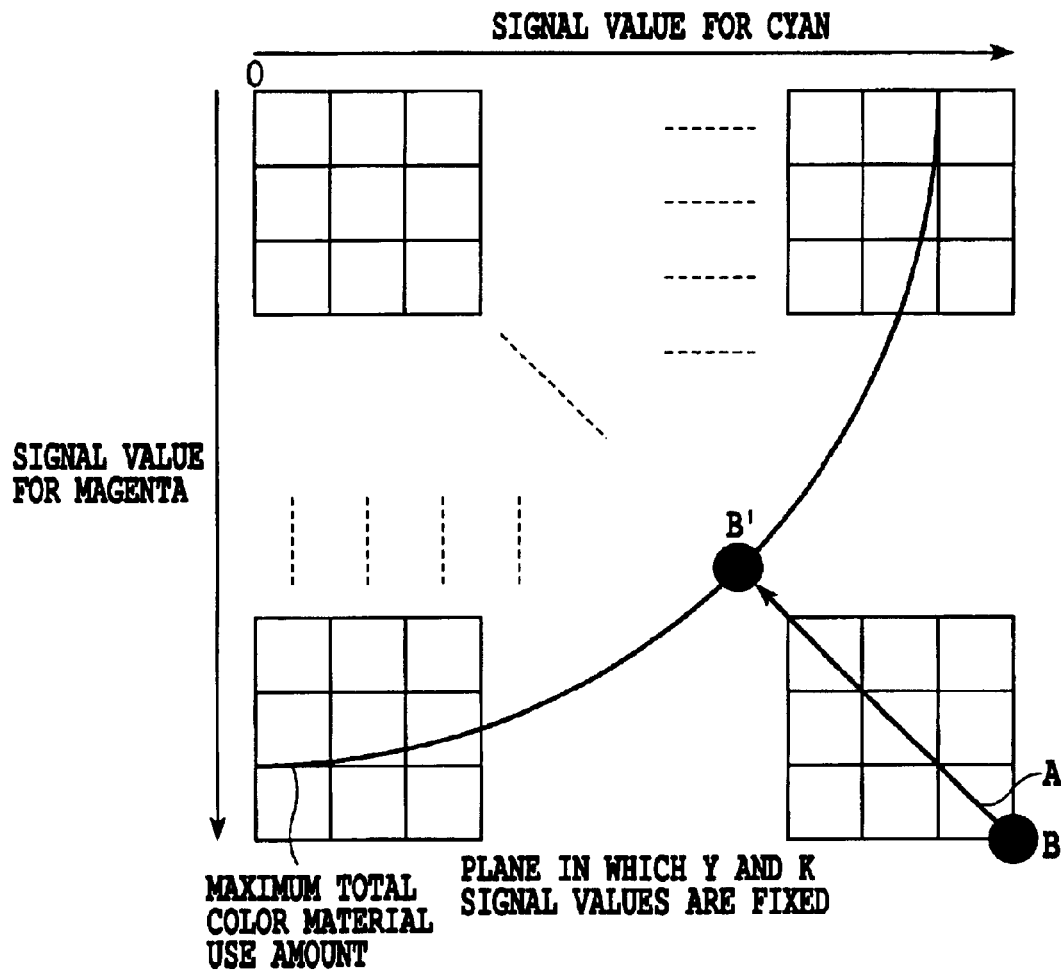
FIG. 13 is a diagram showing a boundary of the maximum total color material use amount in the patches which is determined in the patch image generating process.

FIG. 13 is a diagram of patches showing the boundary for the maximum total color material use amount determined as described above. FIG. 13 is similar to FIG. 7, relating to the first embodiment. In the present embodiment, in step S2005, the signal values for all the patches are uniformly compressed so that the total color material use amounts for all the patches are located inside the boundary line.

Figure 14:
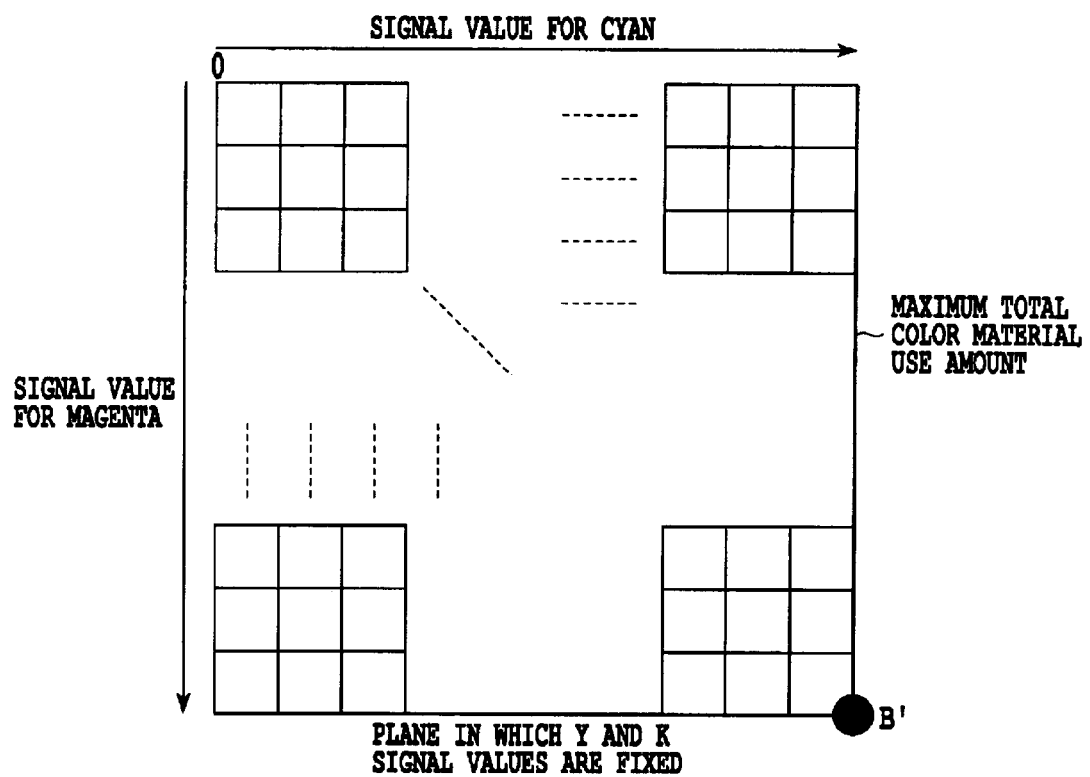
FIG. 14 is a diagram showing the results of a patch data compressing process in the patches based on information on the boundary of the maximum total color material use amount, in the color separation table generating process.

Specifically, in step S2005, a patch used color material combination redetermining process 1905 is executed to compress the M and C values for all the patches in accordance with the compression rate calculated in step S2004. As described above in FIG. 1, if either of the color materials M and C has a different conversion rate (that is, a different rate of contribution to the total color material use amount) in the calculation of the color material use amount, its signal value is compressed at a compression rate corresponding to this conversion rate. For example, if the maximum conversion rate is 80%, the corresponding compression rate is 80% of the calculated compression rate. The above process compresses the point B, which most significantly exceeds the maximum total color material use amount as shown in FIG. 13, in the direction of arrow A toward the origin, down to a point B'. Further, as shown in the patch image in FIG. 14, adjustment is made so that for all the patches in the patch image, the total color material use amount does not exceed the maximum total color material use amount.

The processing in steps S404 and S405 in FIG. 4 is similar to that in the first embodiment, described above, the processing being based on the results of the colorimetric operation on the patches for which the data has been generated as described above. Accordingly, the description of this processing is omitted.

(Third Embodiment)

The present embodiment relates to image processing associated with the actual generation of printing data using the color separation table for the color translation, obtained in the first or second embodiment, described above.

Specifically, on the basis of the 4-color separation table data for each of the six hues, obtained in the first or second embodiment, a predetermined interpolating method is used to determine combinations of the color material signals C, M, Y, and K which correspond to $L^*a^*b^*$ values defining lattice points in the table or R, G, and B values corresponding to the $L^*a^*b^*$ values. The combinations are then stored in the ROM 304 or the like as a LUT (Look-Up Table).

The combinations may also be stored in the external storage 308, the CD drive 310 or FD drive 311, or external equipment. In the case of the external equipment, the RAM 305 is caused to call this equipment via the transmission equipment 314 such as the modem or network card.

Figure 15:
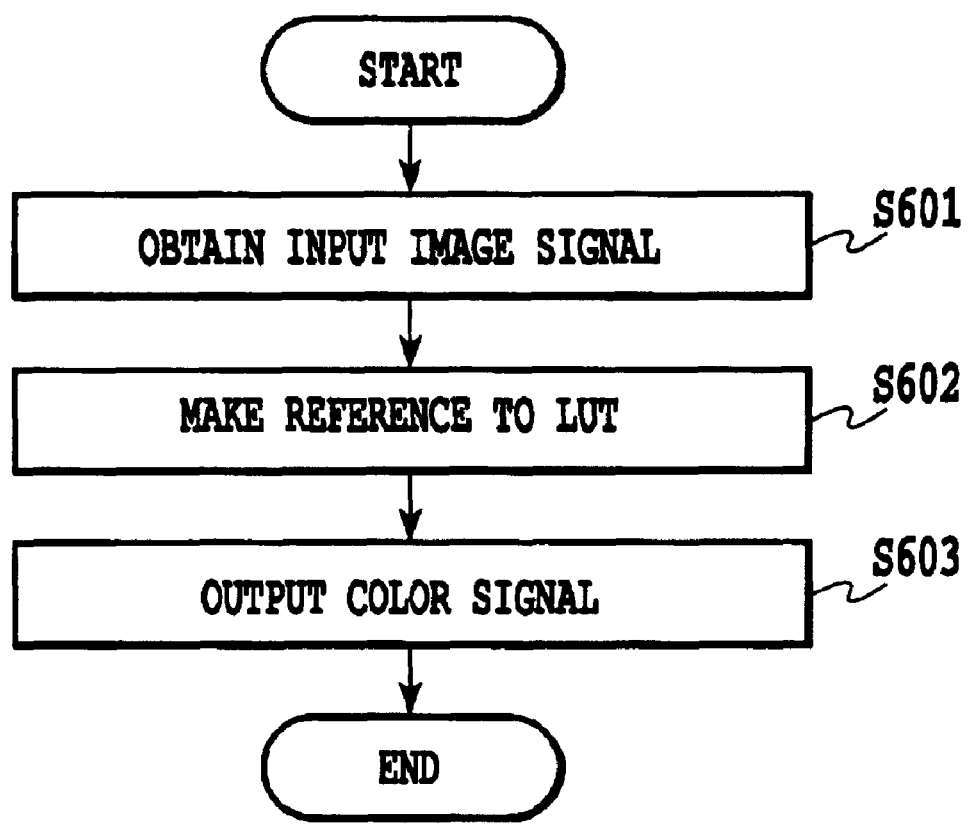
FIG. 15 is a flow chart showing a procedure of image processing using the color separation table generated in the above embodiments.

FIG. 15 is a flow chart showing a procedure of image processing using the color separation table generated as described above.

In this figure, first, at step S601, an input image signal is obtained. The input image signal may be inputted by using the spectrophotometer 201, shown in FIG. 3, connecting a color image scanner or the like to the connection I/O 302 to the image input apparatus, or using the external storage device 308, the CD drive 310, or the FD drive 311. In this case, the input image signal is color information such as R, G, and B values, $L^*a^*b^*$ values, or the like. The inputted input image signal is temporarily stored in the RAM 305.

Then, in step S602, the optimum combination of the color material signals which corresponds to the inputted input image signal is determined with reference to the above LUT, called by the RAM 305.

Then, in step S603, the optimum combination of the color material signals which maximally represents the saturation of the input image signal is outputted via the RAM 305 and supplied to the printer 204 as a print signal. Once step S603 is ended, the present process is finished.

In the above embodiments, ink has been described as an example of the color materials. However, as is apparent from the above description, the present invention is similarly applicable to other color materials, e.g. toner used in the electro-photographic method.

(Other Embodiment)

Further, the present invention is not limited to an apparatus and a method realizing the above described embodiments. Embodiments are also included in the category of the present invention, wherein program codes of software, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves shown in FIGS. 4, 6, 12, and 15 implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments. Further, any configuration including at least one of various features described above is included in the range of the present invention.

As described above, according to the embodiments of the present invention, a combination of color material data for each patch is set under a condition that a total use. amount of the color materials for each patch is within the maximum total color material use amount that is determined by taking into account the adhesion characteristics of the color materials such as the absorption characteristic of ink to a printing medium used by the image output apparatus to output the patches, a target color is set on the basis of colorimetric values of the patches that are outputted on the basis of the above set color material data for the patches, and a combination of plural types of color materials corresponding to the set target color is determined to set a conversion relationship for generating color material data. Accordingly, when the target color for a color transformation or the like is set to determine the conversion relationship such as a table for generating color material data, it is possible to output appropriate patches that do not cause ink overflow or toner non-adhesion and to determine the conversion relationship based on the colorimetric values of the appropriate patches.

Further, first patch data is provided which is a combination of respective data for plural types of color material used to output a patch and which is set for each of a plurality of patches, and with the first patch data, if the total amount of color materials used for any of the patches is equal to or larger than the maximum total color material use amount which is set taking into account the adhesion characteristics of the color materials such as the absorption of ink or adhesion of toner to a printing medium used by the image output apparatus to output the patches, a process is executed for the first patch data to reduce the total amount of color materials used below the maximum total color material use amount to generate second patch data. Thus, patches outputted on the basis of the second patch data serve to prevent inappropriate patch outputs such as ink overflow and inappropriate toner adhesion.

As a result, it is possible to maximize the utilization of a color space which an image out put apparatus such as a printer can use as well as obtain accurate colorimetric values of patches without inappropriate colorimetric values due to failed print outputting of the patches and table data based on the accurate calorimetric values.

The present invention has been described in detail with respect to preferred embodiments, and it will now be apparent from the foregoing to those skilled in the art that changes and modifications maybe made without departing from the invention in its broader aspects, and it is the intention, therefore, in the appended claims to cover all such changes and modifications as fall within the true spirit of the invention.

What is claimed is:

1. An image processing method for determining a conversion relationship by using patches, the conversion relationship relating to a generation of color material data for an image output apparatus that outputs an image by using a plurality kinds of color material, said method comprising the steps of:
   providing a maximum total color material use amount which is determined by taking into account an adhesion characteristic of each of the plurality kinds of color material to a printing medium used when the image output apparatus outputs the patches;
   determining, for each of patches, a combination of data for the plurality kinds of color material constituting the patch within a range of the maximum total color material use amount;
   determining a target color on the basis of colorimetric values of the patches which are outputted based on the determined combinations of data for the plurality kinds of color material for the patches; and
   determining a combination of data for the plurality kinds of color material corresponding to the color target, and based on the determined combination for the color target, determining the conversion relationship relating to the generation of color material data.

2. An image processing method as claimed in claim 1, wherein colors of the plurality kinds of color material are yellow, magenta, cyan and black.

3. An image processing method as claimed in claim 1, wherein the target color is a color having the highest saturation for each of six hues of yellow, magenta, cyan, red, green and blue.

4. An image processing method as claimed in claim 3, wherein the target colors in six hues of yellow, magenta, cyan, red, green and blue are colors changing in a L*C* plane from white to black through yellow, from white to black through magenta, from white to black through cyan, from white to black through red, from white to black through green, and from white to black through blue, respectively.

5. An image processing method as claimed in claim 4, wherein the target color is determined as a line in the L*C* plane which is formed by joining a target line that does not include black at all onto a target line that include black maximally by means of a continuous function from a predetermined point on a L*.

6. An image processing method as claimed in claim 1, wherein the color material is ink.

7. An image processing method as claimed in claim 1, wherein the color material is toner.

8. An image processing method for generating data for outputting a patch from an image output apparatus, the patch being used for correcting an output characteristic of the output apparatus that outputs an image by using a plurality kinds of color material, said method comprising the steps of:
   providing a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;
   determining a total use amount of the plurality kinds of color material for outputting the patch, based on the combination of data for the plurality kinds of color material for each patch in the first patch data; and
   generating second patch data by for each patch comparing the total use amount with the maximum total color material use amount and by executing a process on the first patch data based on the comparison result for each patch so that the total use amount is equal to or less than the maximum total color material use amount.

9. An image processing method as claimed in claim 8, wherein the process by which the total use amount becomes equal to or less than the maximum total color material use amount is a process that compresses the data for the plurality kinds of color material for each patch in the first patch data at a predetermined compression rate.

10. An image processing method as claimed in claim 8, wherein the predetermined compression rate is changed in accordance with a contribution rate of each color material, the contribution being used when the total use amount of the plurality kinds of color material is determined.

11. An image processing method as claimed in claim 8, further comprising the step of generating a table for correcting the output characteristic on the basis of colorimetric values of patches outputted based on the second patch data.

12. An image processing method as claimed in claim 11, wherein the table for correcting the output characteristic is generated within a range of colorimetric values as the table that generates data for the plurality kinds of color material for a color having the highest saturation for each of six hues.

13. An image processing method as claimed in claim 11, further comprising the step of generating the data for the plurality kinds of color material used in the image output apparatus outputting an image, by making reference to the table with input image data.

14. An image processing method as claimed in claim 8, wherein the target color is a color having the highest saturation for each of six hues of yellow, magenta, cyan, red, green and blue.

15. An image processing method as claimed in claim 8, wherein the color material is ink.

16. An image processing method as claimed in claim 8, wherein the color material is toner.

17. An image processing apparatus for determining a conversion relationship by using patches, the conversion relationship relating to a generation of color material data for an image output apparatus that outputs an image by using a plurality kinds of color material, said apparatus comprising:

holding means for holding a maximum total color material use amount which is determined by taking into account an adhesion characteristic of each of the plurality kinds of color material to a printing medium used when the image output apparatus outputs the patches;

patch data setting means for setting, for each of patches, a combination of data for the plurality kinds of color material constituting the patch within a range of the maximum total color material use amount;

target color setting means for determining a target color on the basis of colorimetric values of the patches which are outputted based on the determined combinations of data for the plurality kinds of color material for the patches; and color separating means for determining a combination of data for the plurality kinds of color material corresponding to the color target, and based on the determined combination for the color target, determining the conversion relationship relating to the generation of color material data.

18. An image processing apparatus as claimed in claim 17, wherein colors of the plurality kinds of color material are yellow, magenta, cyan and black.

19. An image processing apparatus as claimed in claim 17, wherein the target color is a color having the highest saturation for each of six hues of yellow, magenta, cyan, red, green and blue.

20. An image processing apparatus as claimed in claim 19, wherein the target colors in six hues of yellow, magenta, cyan, red, green and blue are colors changing in a $L^*C^*$ plane from white to black through yellow, from white to black through magenta, from white to black through cyan, from white to black through red, from white to black through green, and from white to black through blue, respectively.

21. An image processing apparatus as claimed in claim 20, wherein the target color is determined as a line in the $L^*C^*$ plane which is formed by joining a target line that does not include black at all onto a target line that include black maximally by means of a continuous function from a predetermined point on a $L^*$.

22. An image processing apparatus as claimed in claim 17, wherein the color material is ink.

23. An image processing apparatus as claimed in claim 17, wherein the color material is toner.

24. An image processing apparatus for generating data for outputting a patch from an image output apparatus, the patch being used for correcting an output characteristic of the output apparatus that outputs an image by using a plurality kinds of color material, said apparatus comprising:

holding means for holding a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;

total use amount calculating means for determining a total use amount of the plurality kinds of color material for outputting the patch, based on the combination of data for the plurality kinds of color material for each patch in the first patch data; and patch data generating means for generating second patch data by for each patch comparing the total use amount with the maximum total color material use amount and by executing a process on the first patch data based on the comparison result for each patch so that the total use amount is equal to or less than the maximum total color material use amount.

25. An image processing apparatus as claimed in claim 24, wherein the process by which the total use amount becomes equal to or less than the maximum total color material use amount is a process that compresses the data for the plurality kinds of color material for each patch in the first patch data at a predetermined compression rate.

26. An image processing apparatus as claimed in claim 24, wherein the predetermined compression rate is changed in accordance with a contribution rate of each color material, the contribution being used when the total use amount of the plurality kinds of color material is determined.

27. An image processing apparatus as claimed in claim 24, further comprising means for generating a table for correcting the output characteristic on the basis of colorimetric values of patches outputted based on the second patch data.

28. An image processing apparatus as claimed in claim 27, further comprising means for generating the data for the plurality kinds of color material used in the image output apparatus outputting an image, by making reference to the table with input image data.

29. An image processing apparatus as claimed in claim 27, wherein the table for correcting the output characteristic is generated within a range of colorimetric values as the table that generates data for the plurality kinds of color material for a color having the highest saturation for each of six hues.

30. An image processing apparatus as claimed in claim 24, wherein the target color is a color having the highest saturation for each of six hues of yellow, magenta, cyan, red, green and blue.

31. An image processing apparatus as claimed in claim 24, wherein the color material is ink.

32. An image processing apparatus as claimed in claim 24, wherein the color material is toner.

33. A program read by a computer to make the computer execute an image processing for determining a conversion relationship by using patches, the conversion relationship relating to a generation of color material data for an image output apparatus that outputs an image by using a plurality kinds of color material, said image processing comprising the steps of:

providing a maximum total color material use amount which is determined by taking into account an adhesion characteristic of each of the plurality kinds of color material to a printing medium used when the image output apparatus outputs the patches;

determining, for each of patches, a combination of data for the plurality kinds of color material constituting the patch within a range of the maximum total color material use amount;

determining a target color on the basis of calorimetric values of the patches which are outputted based on the determined combinations of data for the plurality kinds of color material for the patches; and determining a combination of data for the plurality kinds of color material corresponding to the color target, and based on the determined combination for the color target, determining the conversion relationship relating to the generation of color material data.

34. A storage medium storing a program readably by a computer, the program making the computer execute an image processing for determining a conversion relationship by using patches, the conversion relationship relating to a generation of color material data for an image output apparatus that outputs an image by using a plurality kinds of color material, said image processing comprising the steps of:

providing a maximum total color material use amount which is determined by taking into account an adhesion characteristic of each of the plurality kinds of color material to a printing medium used when the image output apparatus outputs the patches;

determining, for each of patches, a combination of data for the plurality kinds of color material constituting the patch within a range of the maximum total color material use amount;

determining a target color on the basis of colorimetric values of the patches which are outputted based on the determined combinations of data for the plurality kinds of color material for the patches; and determining a combination of data for the plurality kinds of color material corresponding to the color target, and based on the determined combination for the color target, determining the conversion relationship relating to the generation of color material data.

35. A program read by a computer to make the computer execute an image processing for generating data for outputting a patch from an image output apparatus, the patch being used for correcting an output characteristic of the output apparatus that outputs an image by using a plurality kinds of color material, said image processing comprising the steps of:

providing a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;

determining a total use amount of the plurality kinds of color material for outputting the patch, based on the combination of data for the plurality kinds of color material for each patch in the first patch data; and generating second patch data by for each patch comparing the total use amount with the maximum total color material use amount and by executing a process on the first patch data based on the comparison result for each patch so that the total use amount is equal to or less than the maximum total color material use amount.

36. A storage medium storing a program readably by a computer, the program making the computer execute an image processing for generating data for outputting a patch from an image output apparatus, the patch being used for correcting an output characteristic of the output apparatus that outputs an image by using a plurality kinds of color material, said image processing comprising the steps of:

providing a first patch data that is a combination of data for a plurality kinds of color material to be used for outputting the patch and is determined for each of a plurality of patches, and a maximum total color material use amount which is determined by taking into account an adhesion characteristic of each of the plurality kinds of color material to a printing medium used when the image output apparatus outputs the patches;

determining a total use amount of the plurality kinds of color material for outputting the patch, based on the combination of data for the plurality kinds of color material for each patch in the first patch data; and generating second patch data by for each patch comparing the total use amount with the maximum total color material use amount and by executing a process on the first patch data based on the comparison result for each patch so that the total use amount is equal to or less than the maximum total color material use amount.

37. An image processing method for determining a conversion relationship using patches, the conversion relationship for use in generating color material data for an image output apparatus which outputs an image using a plurality of color materials, said method comprising the steps of:

providing a maximum total color material use amount which is based on an adhesion characteristic of the color materials to a printing medium used by the image output apparatus;

determining a combination of data to output the patches using the color materials within a range of the maximum total color material use amount; and determining a predetermined conversion relationship for generating color material data corresponding to the color materials based on measured values of the patches which are output based on the determined combination.

38. An image processing method as claimed in claim 37, wherein the color materials comprise magenta, cyan, yellow and black.

39. An image processing method as claimed in claim 37, wherein the maximum total color material use amount is determined by a type of printing medium.

40. A program read by a computer, which causes the computer to determine a conversion relationship using patches, the conversion relationship for use in generating color material data for an image output apparatus which outputs an image using a plurality of color materials, the program comprising the steps of:

providing a maximum total color material use amount which is based on an adhesion characteristic of the color materials to a printing medium used by the image output apparatus;

determining a combination of data to output the patches using the color materials within a range of the maximum total color material use amount; and determining a predetermined conversion relationship for generating color material data corresponding to the color materials based on measured values of the patches which are output based on the determined combination.

41. A program as claimed in claim 40, wherein the color materials comprise magenta, cyan, yellow and black.

42. A program as claimed in claim 40, wherein the maximum total color material use amount is determined by a type of printing medium.

* * * * *